US008687129B2

(12) United States Patent
Henty

(10) Patent No.: US 8,687,129 B2
(45) Date of Patent: Apr. 1, 2014

(54) TV INTERFACE CONTROL SYSTEM AND METHOD WITH AUTOMATIC SEARCH

(75) Inventor: David L. Henty, Newport Beach, CA (US)

(73) Assignee: I-Interactive LLC, Irvine, CA (US)

( * ) Notice: Subject to any disclaimer, the term of this patent is extended or adjusted under 35 U.S.C. 154(b) by 1283 days.

(21) Appl. No.: 12/077,891

(22) Filed: Mar. 21, 2008

(65) Prior Publication Data

US 2008/0246890 A1    Oct. 9, 2008

Related U.S. Application Data

(60) Provisional application No. 60/919,683, filed on Mar. 23, 2007, provisional application No. 60/921,717, filed on Apr. 4, 2007, provisional application No. 60/927,762, filed on May 4, 2007.

(51) Int. Cl.
*H04N 5/44* (2011.01)
(52) U.S. Cl.
USPC .......................................... 348/734; 348/569
(58) Field of Classification Search
USPC ................ 348/734, 563–565, 569, 570, 725, 348/553–555; 455/575.3, 575.1, 151.1, 455/179.1, 566; 725/38–40, 43–45, 52–53, 725/109, 56–57, 61; 341/176, 173, 20
IPC ....................................................... H04N 5/44
See application file for complete search history.

(56) References Cited

U.S. PATENT DOCUMENTS

| 6,094,156 | A | 7/2000 | Henty |
| 6,765,557 | B1 | 7/2004 | Segal et al. |
| 7,461,061 | B2 * | 12/2008 | Aravamudan et al. ................ 1/1 |
| 7,539,472 | B2 * | 5/2009 | Sloo ........................... 455/151.1 |
| 7,605,742 | B2 * | 10/2009 | Chuang et al. ................. 341/176 |
| 8,327,348 | B2 * | 12/2012 | Seiden .......................... 717/173 |
| 2003/0009771 | A1 | 1/2003 | Chang |
| 2003/0067554 | A1 | 4/2003 | Klarfeld et al. |
| 2004/0181818 | A1 | 9/2004 | Heyner et al. |
| 2005/0159194 | A1 | 7/2005 | Heintz et al. |
| 2005/0162569 | A1 * | 7/2005 | Fairhurst et al. .............. 348/734 |
| 2005/0235319 | A1 | 10/2005 | Carpenter et al. |
| 2005/0240982 | A1 | 10/2005 | Blackketter et al. |

OTHER PUBLICATIONS

Office Action dated May 10, 2011 from U.S. Appl. No. 12/080,535.
Office Action dated Feb. 10, 2012 from U.S. Appl. No. 12/080,535.
Office Action dated Sep. 5, 2012 from U.S. Appl. No. 12/080,535.

* cited by examiner

*Primary Examiner* — Trang U Tran

(57) ABSTRACT

An automatic search system and method is disclosed which automatically displays a search menu on a TV in response to opening a remote control having an internal concealed keyboard. Since a text entry keyboard is known to be in use a streamlined search menu may be displayed without an on screen keyboard. A separate on screen keyboard search menu may be activated in a different mode by using the remote in a closed configuration.

5 Claims, 8 Drawing Sheets

TV INTERFACE CONTROL SYSTEM AND METHOD WITH AUTOMATIC SEARCH

RELATED APPLICATION INFORMATION

The present application claims priority to provisional application Ser. No. 60/919,683 filed Mar. 23, 2007, to provisional application Ser. No. 60/921,717 filed Apr. 4, 2007, and to provisional application Ser. No. 60/927,762 filed May 4, 2007, the disclosures of which are incorporated herein by reference in their entirety.

BACKGROUND OF THE INVENTION

1. Field of the Invention

The present invention relates to TV interfaces and control systems and methods for controlling entertainment systems employing a TV as a display device.

2. Description of the Prior Art and Related Information

Modern TV based entertainment systems have the ability to access a large variety of content. Such content ranges from large numbers of digital TV channels, movies available through online pay per view or other subscription access services via cable or satellite, other online available media, as well as various locally stored media such as audio, pictures and video, and internet access. Accessing such content efficiently is impossible without employing a search feature of some type. At the same time control of a TV based system is typically via a handheld remote control. The majority of remote controls employ an Up-Down-Left-Right (UDLR) set of control buttons to navigate through the various menus to control the entertainment system. Employing this type of menu control for searching typically involves going through a series of menu prompts with the UDLR control buttons to initiate a search followed by text entry for the search again using the UDLR buttons. This text entry involves an on screen alpha numeric listing which is scrolled through via the UDLR control buttons to select text and numbers one letter or number at a time. A typical search menu layout of this type is shown in FIG. 1.

On screen alpha numeric listings for search menus generally fall into two types, one a keyboard style listing of the alphabet and numbers such as shown in FIG. 1 and the other a keypad type layout similar to a telephone keypad which uses a texting type input format. In either case the input of text for searching is extremely slow requiring repeated activation of the UDLR control buttons. This limitation on text entry from a remote control has limited the desirability of search functions and hampered user acceptance and use of digital media systems and the large amounts of media content which are available.

Accordingly a need exists for an easier way to search media content using a handheld remote control.

SUMMARY OF THE INVENTION

In a first aspect the present invention provides a method for automatically initiating a search mode in a TV environment. The method comprises detecting opening of a remote control having a concealed text entry keyboard and displaying a search menu on the TV screen in response to said detecting.

In a preferred embodiment of the method displaying a search menu on the TV screen may comprise selecting one search menu from a plurality of search menus based on the TV viewing mode when said detecting occurs and displaying said selected search menu. The plurality of search menus may include a TV guide search menu and a video on demand search menu and the viewing modes may comprise viewing a TV show and viewing an on demand movie, respectively. The plurality of search menus may also include a video search menu, and a picture search menu and the viewing modes may comprise viewing a video, and viewing pictures, respectively. The remote control may preferably comprise a folding remote with a QWERTY keyboard on the inner surfaces of the folding remote and the detecting comprises detecting opening of the folding keyboard. The method may further comprise detecting closing of the remote and returning to the prior viewing mode if a search result has not been selected. The method may further comprise toggling through different search menus in response to activation of a search mode key in said text entry keyboard. For example, the search mode key may toggle between a plurality of different media groups. The same or a different search mode key may also toggle between different search fields including title and actor search fields. The search menu may be displayed in a partial screen along with the program being viewed.

In another aspect the present invention provides a method for initiating a search mode in a TV environment, comprising initiating a search mode in a first manner using first selection inputs on a top outside portion of a remote control using text entry employing said first selection inputs and initiating a search mode in a second manner using text entry keys on an inner keyboard of the remote, wherein the first and second search modes employ different first and second search menus.

In a preferred embodiment of the method initiating a search mode in a first manner comprises using a series of on screen menu selections employing the first selection inputs to display a first search menu and initiating a search mode in a second manner comprises detecting opening of the remote control to reveal the text entry keyboard, and displaying a search menu on the TV screen in response to the detecting. The first search menu may include an on screen keyboard and the second search menu does not include an on screen keyboard since text entry is available from the keyboard. The first search menu may be displayed full screen due to the on screen keyboard and the second search menu is displayed in a partial screen along with the program being viewed. The first selection inputs may comprise up, down, left, right buttons.

In another aspect the present invention provides a method for automatically initiating a search mode in a TV environment, comprising detecting opening of a remote control having a concealed text entry keyboard and selecting one of a plurality of different search menus based on the prior search patterns of the user or a user setting. The method further comprises displaying the selected search menu on the TV screen in response to the detecting and entering text into the search menu in response to text entry from the keyboard.

In a preferred embodiment of the method the plurality of search menus are at different levels and the selecting displays a higher or lower level menu based on prior search patterns. In particular, a higher level menu preferably searches plural media groups.

In another aspect the present invention provides an entertainment system adapted for use with a TV. The system comprises a media device adapted to be coupled to the TV and control display of media including TV shows and a remote control having an open and closed configuration with first inputs accessible in the closed configuration and second inputs including text entry keys accessible in the open configuration. The remote control includes one or more transmitters for transmitting controls signals to the media device including a signal indicating opening of the remote. The media device includes control programming to initiate display of a search menu automatically in response to receiving the control signal indicating opening of the remote and to receive text entry for the search transmitted from the remote from activation of said text entry keys.

Further aspects of the invention will be appreciated from the following detailed description of the invention.

DETAILED DESCRIPTION OF THE INVENTION

U.S. Pat. No. 6,094,156 ('156 patent) and U.S. Pat. No. 7,123,242 ('242 patent) are incorporated herein by reference in their entirety. In the above noted '156 and '242 patents the above noted problems were addressed by a folding remote control system and method with a keyboard configured on the inner surfaces of the folding remote. This system and method allows easy text entry when desired by opening the folding remote and using the keyboard within the remote. The remote also has conventional UDLR buttons on the outside of the remote allowing control of menus in a conventional manner. The present invention provides a TV interface and control method adapted for simple and quick searching which may preferably employ such a remote with keyboard.

Figure 1:
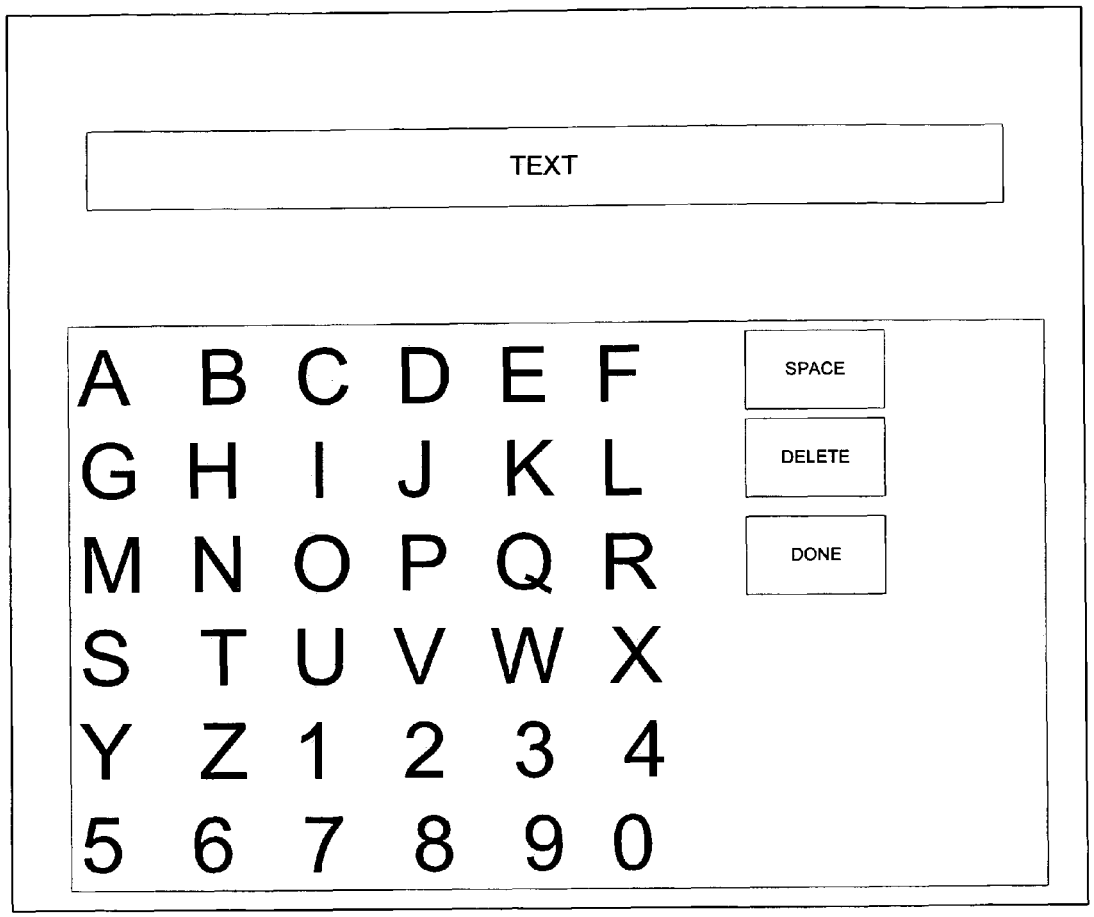
In FIG. 1 a search menu with an on screen keyboard layout is shown.
Figure 2:
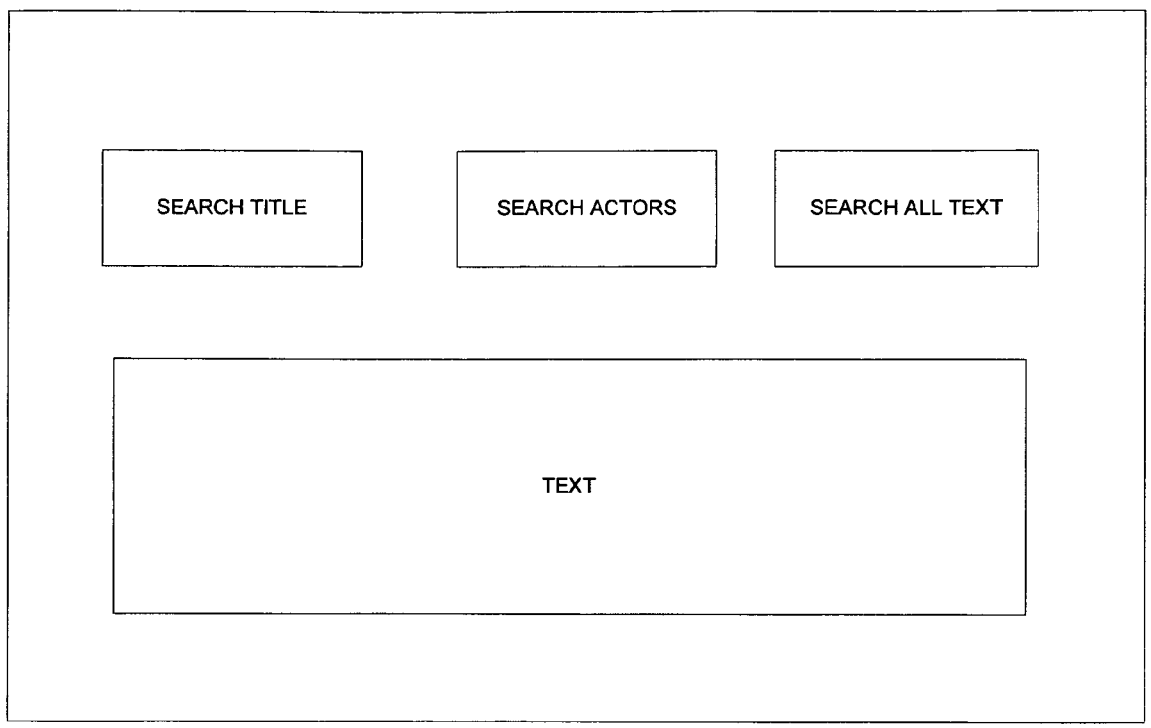
In FIG. 2 a streamlined search menu in accordance with the invention is illustrated.

Referring to FIG. 2 a streamlined search menu is illustrated. This menu is adapted for use with keyboard text entry rather than UDLR entry and is much simpler than the search menu of FIG. 1. This menu illustrates a search adapted for example for a cable TV or satellite TV application and may allow for easy searching for a movie in an on demand setting or a TV program or channel from an extensive TV guide listing. The menu therefore simply employs a text box and a search field selection menu for title, actor or full text search. For channel or TV program searching additional or different search field options may be employed.

Figure 3:
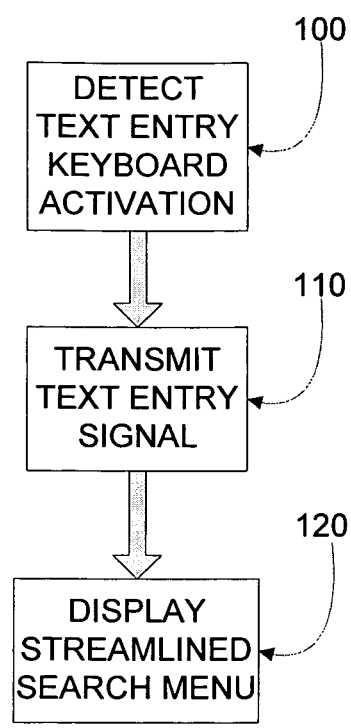
In FIG. 3 an interface control method accordance with the invention is illustrated.

Referring to FIG. 3 the interface control method is illustrated. During operation with the remote closed and using UDLR controls the conventional menu navigation may be employed and if desired searches may be initiated using the menu of FIG. 1 and UDLR text entry. When the remote is opened to expose the internal text entry keyboard this is detected at 100. More specifically, as described in the above noted patents the remote has a sensor which detects opening of the remote which is used to disable the outside buttons. For example as described in the noted patents the switch may be coupled to a latch or to a hinge. At 110 this remote opening detection is used to transmit a signal using the remote control transmitter (either IR or RF) to the entertainment control device 218 or TV 222 (FIG. 8) to control the displayed interface. At 120 in response to this signal the device 218, 222 automatically displays the streamlined search menu such as in FIG. 2. The streamlined search menu may be superimposed on the menu or program being viewed when the signal is received in a partial screen window which menu may be easily accommodated in a partial screen due to the simple nature of the search menu and lack of need for the text of the menu of FIG. 1. Alternatively the streamlined search menu may be displayed full screen displacing the menu or program being viewed on the screen of TV 222. In either case the user is able to immediately enter text to initiate searching, changing the search option field if necessary. The search results may be displayed immediately within the search menu window once text is entered or alternatively the full search text may be entered before initiating the search (e.g., by enter or OK on the keyboard) and the search results displayed in a separate window. It will readily be appreciated that this automatic search control is dramatically simpler and faster than conventional approaches using a remote.

Figure 4:
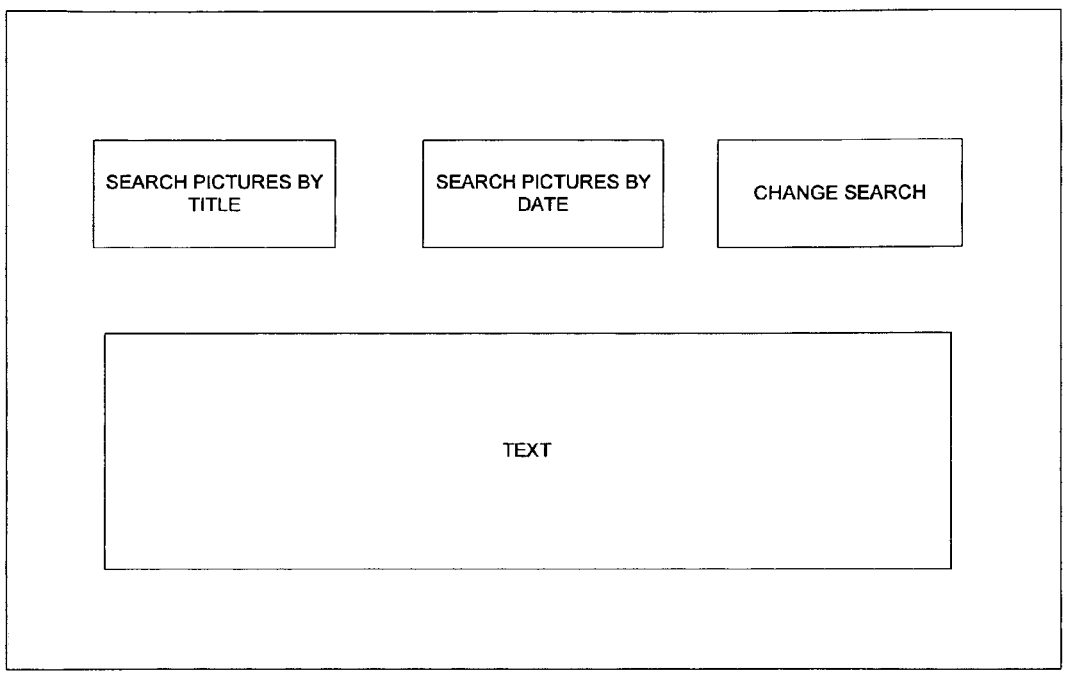
In FIGS. 4 and 5 search menus are illustrated for an embodiment of the invention where several different searchable media groups are available.
Figure 5:
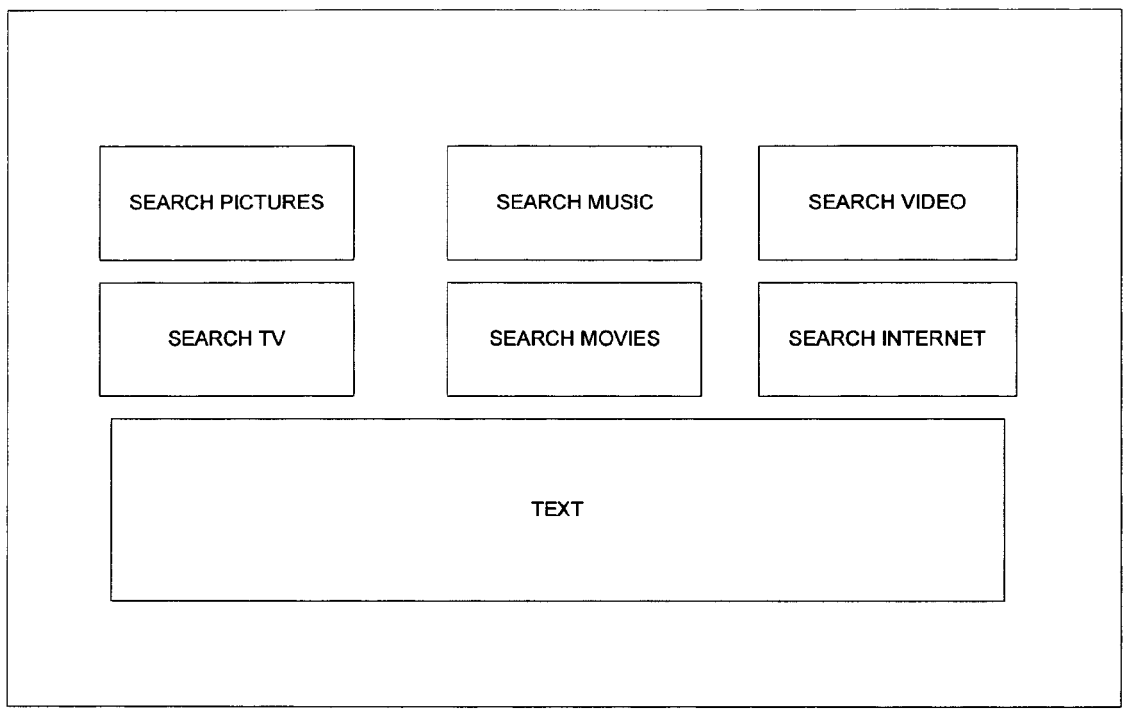
Figure 6:
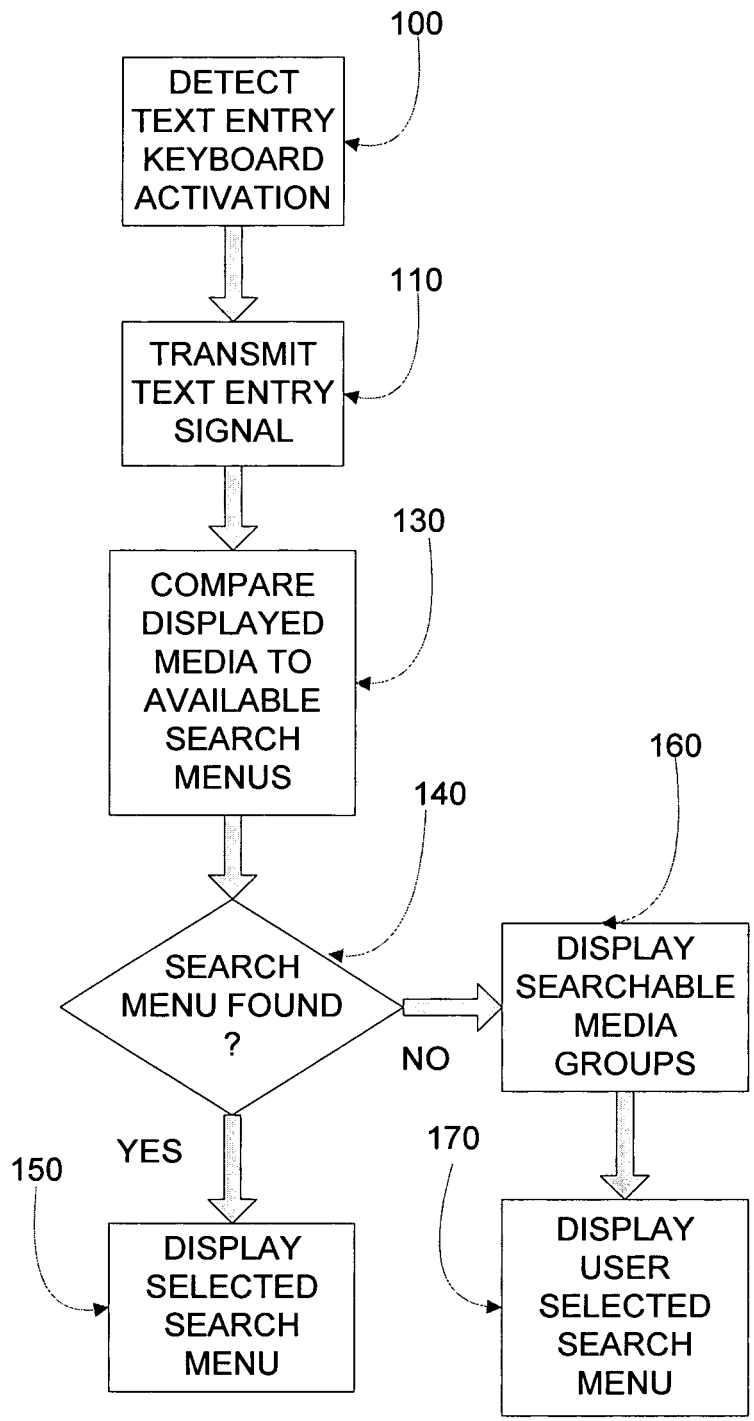
In FIG. 6 the interface control flow is illustrated in accordance with an embodiment of the invention.

Referring to FIGS. 4-6 search menus and interface control flow are illustrated for an application where several different searchable media groups are available. For example, the media control device 218 may access locally stored (including locally networked storage) pictures, music and video files in a typical digital multi-media entertainment system, as well as TV channels/programs and on demand movie content as described above. A sample picture search menu is shown in FIG. 4, with similar menus for music and video. Also, depending on the device 218 internet search capability may also be provided. In FIG. 5 a higher level search menu is shown while in FIG. 6 the control flow is illustrated. As in the example of FIG. 3 above the control flow proceeds at 100 and 110 to detect keyboard text entry and transmit a signal to automatically initiate search menu display. Since multiple search options are available the flow proceeds at 130 to compare the likely search menu from the displayed content and at 140 to decide if a matching menu is found. If for example the display is already in pictures the menu of FIG. 4 is selected at 140 and displayed at 150. Similarly for video or music or other searchable media group (or internet). If a different search field and menu is desired than the one automatically selected and displayed the selected menu (such as the example menu of FIG. 4) includes a change search selection which takes the displayed menu to a higher level as in FIG. 5 to allow selection of the media group to search. Alternatively, the change search selection may scroll (or toggle) through successive search fields/media groups. Also, instead of the manual change search selection being on screen, a dedicated change search button may be provided on the keyboard to further speed search selection and reduce on screen menu navigation. Also separate such search mode buttons for toggling through media groups (e.g., TV guide, VOD, pictures, on line video, music, etc.) and toggling through search fields (e.g., actor, title, full text, show category, etc.) may be provided on the keyboard.

These automatic menu selection steps 130, 140, 150 (along with the manual search change selection) may incorporate a memory and learning function. For example, an automatic search menu selected at 130-150 from live TV program viewing may typically go to a TV search menu as in FIG. 2. However, if this automatic selection is repeatedly altered via a manual search change to an internet search, then an internet search menu will become the default automatic search menu displayed. This learning feature may be user settable as to the number of changes required before altering the default automatic menu selection and also may be reset to the original default by the user. Similarly, the field to be searched may be learned, for example, a default title search menu may change to a default actor or category search menu. If at 140 no matching menu is found the automatic search menu flow proceeds at 160 to display a higher level search field menu with available searchable media groups (and internet if accessible by the device) as shown in FIG. 5 and allow display of a user selected search menu at 170. (Or alternatively at 170 text entry directly in the menu of FIG. 5 may be made, followed by search of the selected media group in a default category, such as "title", when the search field is highlighted and selected—followed by display of the appropriate search menu and search results). For example, the interface control may follow this flow and may jump directly to that of FIG. 5 when a media group is not being displayed or when the automatic search mode is repeatedly changed manually in previous automatic selections but in an inconsistent manner.

Figure 7:
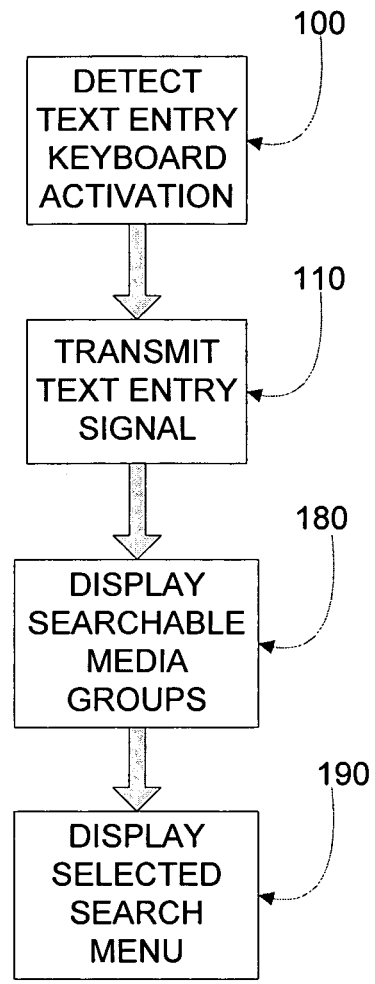
In FIG. 7 the interface control flow is illustrated in accordance with an alternate embodiment of the invention.

Alternatively the automatic search initiated at 100, 110 may go directly to a higher level menu as shown in FIG. 5. This is shown in FIG. 7 at 180 and the user then selects the search mode from the menu which is then displayed at 190. This flow may be a user settable option bypassing the full automatic search menu selection of FIG. 6 if desired.

Figure 8:
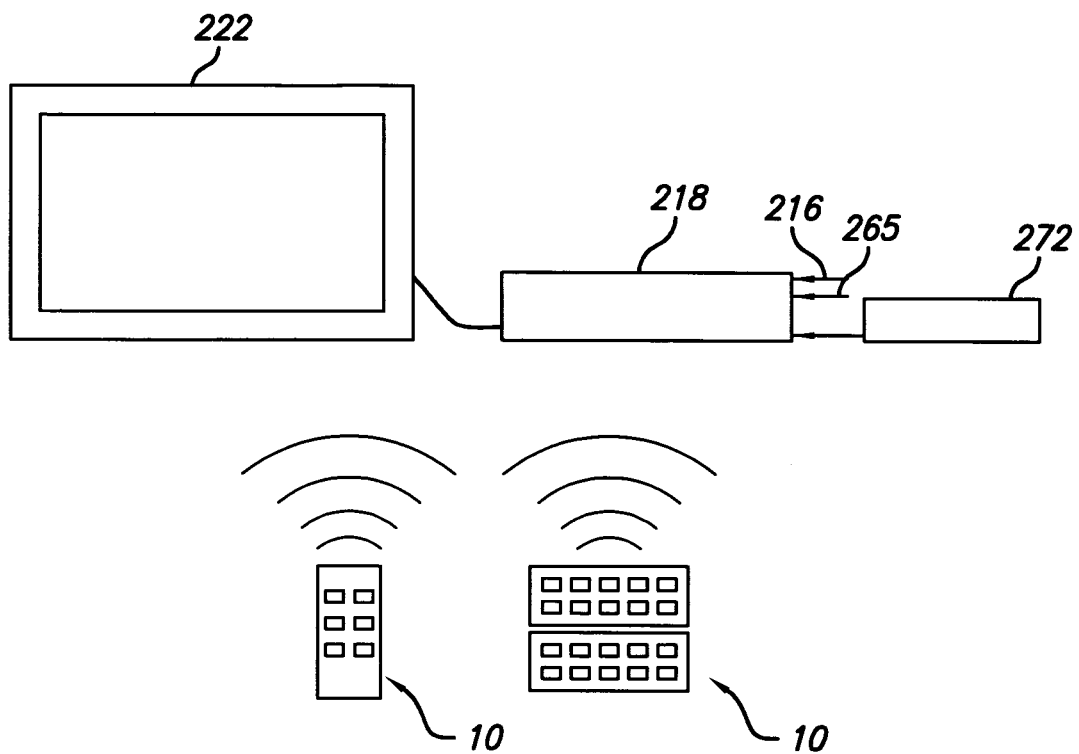
In FIG. 8 an improved entertainment system employing the automatic search features in accordance with the present invention is illustrated.

Referring to FIG. 8 an improved entertainment system employing the automatic search features in accordance with the present invention is illustrated. As shown, the entertainment system includes a TV monitor 222 which is coupled to a data processing device 218 of the type which receives text input control signals for searching as described above and controls the interface displayed on the TV. Also, additional devices or inputs may be provided to the entertainment system, e.g., a DVR 272, wired or wireless networked device coupled to a PC or other media server and other video and data inputs indicated generally by inputs 216 and 265 in FIG. 8. Also shown is remote 10, illustrated in both the first (open) and second (closed) configurations as described above. Remote 10 provides typical TV type control signals to the entertainment system in the second (closed) position, such as volume up/down and power, UDLR controls, etc., and text input control signals in the first (open) position as described above, and detects opening and transmits the text input activation signal as described at 100, 110 above. Also in the open position the keys may preferably include a first search mode key for toggling through media groups and/or a second search mode key for toggling through search fields and/or a text mode key as described in the in '717 application incorporated herein by reference.

Although the above automatic search features preferably employ a device 218 such as a set top box, networked PC or other media control device adapted for the search and text entry described, in some cases the use of older devices or devices without dedicated process flow as above may be used by transmitting commands, such as macros of plural rapid commands to emulate the desired functions on an existing device. For example, a macro of commands may be transmitted upon detecting opening of the remote which takes the display to a search menu normally accessed via a series of menu selections. Also a device adapted for text entry via an on screen or triple tap type input may be used to generate text from the remote QWERTY keyboard by emulating the text entry commands with a series of commands triggered by activation of each key on the keyboard.

Although the interface control described above is preferably employed with the folding remote illustrated in FIG. 8 and described in the above patents incorporated by reference and responsive to opening the remote, the keyboard text entry detection at 100 above and ensuing control flow may also be initiated by another means such as detection of a text key being pressed in the keyboard or activation of a text search button on the keyboard. In such alternate embodiments the keyboard may be configured differently than the preferred folding design or may even be separate from the remote.

It will be appreciated by those skilled in the art that the foregoing is merely an illustration of the present invention in currently preferred implementations. A wide variety modifications to the illustrated embodiments are possible while remaining within the scope of the present convention. Therefore, the above description should not be viewed as limiting but merely exemplary in nature.

What is claimed is:

1. A method for initiating a search mode in a TV environment, comprising:
    initiating a first search mode in a first manner using one or more first selection inputs on a top outside portion of a remote control using text entry employing said first selection inputs and a first search menu; and
    initiating a second search mode in a second manner using text entry keys on a QWERTY keyboard configured on a different surface of the remote control, wherein initiating said second search mode automatically selects a different second search menu as an initial default setting, wherein said initial default second search menu occupies a substantially smaller portion of the screen than said first search menu, and wherein said first search menu includes an on screen keyboard displayed on the TV and wherein the second search menu does not include an on screen keyboard.

2. A method for initiating a search mode in a TV environment as set out in claim 1, wherein initiating a search mode in a first manner comprises using a series of on screen menu selections displayed on the TV screen employing said first selection inputs to display a first search menu.

3. A method for initiating a search mode in a TV environment as set out in claim 1, wherein initiating a search mode in a second manner comprises detecting operation of the QWERTY text entry keyboard, and displaying said second menu displayed on the TV screen in response to said detecting.

4. A method for initiating a search mode in a TV environment as set out in claim 1, wherein said first search menu is displayed substantially full screen on the TV and wherein said second search menu is displayed in a substantially smaller partial screen along with the program being viewed.

5. A method for initiating a search mode in a TV environment as set out in claim 1, wherein said first selection inputs comprise up, down, left, right buttons.

* * * * *